(12) United States Patent
Veselinovic et al.

(10) Patent No.: US 12,289,528 B2
(45) Date of Patent: Apr. 29, 2025

(54) SYSTEM AND METHOD FOR CAMERA MOTION STABILIZATION USING AUDIO LOCALIZATION

(71) Applicant: Shure Acquisition Holdings, Inc., Niles, IL (US)

(72) Inventors: Dusan Veselinovic, Chicago, IL (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 55 days.

(21) Appl. No.: 18/235,845

(22) Filed: Aug. 19, 2023

(65) Prior Publication Data

US 2024/0064406 A1     Feb. 22, 2024

Related U.S. Application Data

(60) Provisional application No. 63/371,982, filed on Aug. 19, 2022.

(51) Int. Cl.
*H04N 23/695*     (2023.01)
*G10L 25/51*     (2013.01)
(Continued)

(52) U.S. Cl.
CPC ........... *H04N 23/695* (2023.01); *G10L 25/51* (2013.01); *H04N 23/62* (2023.01); *H04N 23/685* (2023.01)

(58) Field of Classification Search
CPC .... H04N 23/695; H04N 23/685; H04N 23/62; H04N 7/147; G10L 25/51
(Continued)

(56) References Cited

U.S. PATENT DOCUMENTS 5,206,721 A   4/1993  Ashida
5,686,957 A  11/1997  Baker
(Continued)

FOREIGN PATENT DOCUMENTS

CN   102843540   12/2012
CN   107809596   3/2018
(Continued)

OTHER PUBLICATIONS

Aarabi, "The Fusion of Distributed Microphone Arrays for Sound Localization," EURASIP Journal on Applied Signal Processing, vol. 2003, No. 4, Jan. 2003, 10 pp.
(Continued)

*Primary Examiner* — Pritham D Prabhakher
(74) *Attorney, Agent, or Firm* — Neal, Gerber & Eisenberg LLP

(57) ABSTRACT

Audio-visual systems and methods are configured to determine a first talker location based on a first group of sound locations corresponding to audio detected by the microphone in association with one or more talkers; receive a new sound location for new audio detected by the microphone in association with at least one talker; determine a proximity of the new sound location to the first group of sound locations; based on the new sound location being in close proximity to one or more of the sound locations in the first group, determine a second talker location based on the new sound location and the first group of sound locations; determine a second proximity of the second talker location to the first talker location; provide the second talker location to the camera if the second proximity meets or exceeds a threshold; and otherwise, provide the first talker location the camera.

20 Claims, 5 Drawing Sheets

(51) Int. Cl.
  *H04N 23/62* (2023.01)
  *H04N 23/68* (2023.01)
(58) Field of Classification Search
  USPC .................................................. 348/208.99
  See application file for complete search history.

(56) References Cited

U.S. PATENT DOCUMENTS

| | | | |
|---|---|---|---|
| 6,731,334 | B1 | 5/2004 | Maeng |
| 6,980,485 | B2 | 12/2005 | McCaskill |
| 7,403,217 | B2* | 7/2008 | Schulz ................. H04N 23/695 |
| | | | 348/E7.083 |
| 7,487,056 | B2* | 2/2009 | Tashev ..................... G01S 7/00 |
| | | | 342/450 |
| 7,586,513 | B2* | 9/2009 | Muren ..................... H04N 7/15 |
| | | | 348/211.4 |
| 8,189,807 | B2* | 5/2012 | Cutler ................... H04N 7/142 |
| | | | 381/92 |
| 8,248,448 | B2 | 8/2012 | Feng |
| 9,338,549 | B2 | 5/2016 | Haulick |
| 9,392,221 | B2 | 7/2016 | Feng |
| 9,489,948 | B1* | 11/2016 | Chu ........................ H04R 3/005 |
| 9,674,453 | B1 | 6/2017 | Tangeland |
| 9,769,424 | B2* | 9/2017 | Michot ..................... G06T 7/20 |
| 9,980,040 | B2* | 5/2018 | Whyte ................... H04N 23/69 |
| 10,091,412 | B1* | 10/2018 | Feng .................... H04N 23/661 |
| 10,491,809 | B2* | 11/2019 | Feng ........................ H04N 7/15 |
| 10,582,117 | B1 | 3/2020 | Tanaka |
| 10,966,022 | B1 | 3/2021 | Chu |
| 11,127,401 | B2* | 9/2021 | Sarkar ..................... G10L 25/78 |
| 11,438,691 | B2* | 9/2022 | Veselinovic ........... H04R 1/326 |
| 11,695,900 | B2* | 7/2023 | Childress, Jr. ........... H04N 7/15 |
| | | | 348/14.01 |
| 11,902,656 | B2* | 2/2024 | Muthiah ................ H04N 7/188 |
| 12,143,806 | B2* | 11/2024 | McElveen ............... H04S 7/307 |
| 2005/0008169 | A1 | 1/2005 | Muren |
| 2005/0140779 | A1 | 6/2005 | Schulz |
| 2005/0283328 | A1 | 12/2005 | Tashev |
| 2009/0323981 | A1 | 12/2009 | Cutler |
| 2011/0285809 | A1* | 11/2011 | Feng ...................... G10L 25/78 |
| | | | 348/E7.083 |
| 2011/0317522 | A1 | 12/2011 | Florencio |
| 2012/0294118 | A1* | 11/2012 | Haulick .................... G01S 5/30 |
| | | | 367/121 |
| 2013/0271559 | A1* | 10/2013 | Feng ...................... H04N 7/142 |
| | | | 348/14.08 |
| 2016/0277712 | A1 | 9/2016 | Michot |
| 2017/0201825 | A1 | 7/2017 | Whyte |
| 2019/0158733 | A1* | 5/2019 | Feng ..................... H04N 23/611 |
| 2021/0051397 | A1 | 2/2021 | Veselinovic |
| 2021/0097995 | A1 | 4/2021 | Sarkar |
| 2021/0360193 | A1 | 11/2021 | Childress, Jr. |
| 2022/0201421 | A1 | 6/2022 | McElveen |
| 2024/0007744 | A1* | 1/2024 | Muthiah ................. H04N 23/90 |

FOREIGN PATENT DOCUMENTS

| | | |
|---|---|---|
| CN | 108063910 | 5/2018 |
| CN | 108370470 | 8/2018 |
| CN | 112311999 | 2/2021 |
| CN | 112689092 | 4/2021 |
| CN | 113099160 | 7/2021 |
| JP | H1042264 | 2/1998 |
| JP | 3739673 | 1/2006 |
| JP | 2020043456 | 3/2020 |
| KR | 101884446 | 8/2018 |
| KR | 102407872 | 6/2022 |

OTHER PUBLICATIONS

DiBiase, et al., "Robust Localization in Reverberant Rooms," Microphone Arrays, 2001, 24 pp.

Gabriel, et al., "Design and assessment of multiple-sound source localization using microphone arrays," Proceedings of the 2019 IEEE/SICE Intl. Symposium on System Integration, Jan. 2019, 6 pp.

International Search Report and Written Opinion for PCT/US2022/076815 dated Jan. 5, 2023, 12 pp.

International Search Report and Written Opinion for PCT/US2023/026753 dated Sep. 15, 2023, 13 pp.

Ishi, et al., "Using multiple microphone arrays and reflections for 3D localization of sound sources," 2013 IEEE/RSJ International Conference on Intelligent Robots and Systems, 6 pp.

Ishi, et al., "Speech activity detection and face orientation estimation using multiple microphone arrays and human position information," IEEE/RSJ Intl. Conference on Intelligent Robots and Systems, 2015, 6 pp.

Legg, et al., "A Combined Microphone and Camera Calibration Technique with Application to Acoustic Imaging," IEEE Transactions on Image Processing, vol. 22, No. 10, pp. 4028-4039, Oct. 1, 2013, 12 pp.

Nishiura, et al., "Collaborative Steering of Microphone Array and Video Camera Toward Multi-lingual Tele-conference Through Speech-to-Speech Translation," IEEE Workshop on Automatic Speech Recognition and Understanding, 2001, 4 pp.

Ronzhin, et al., "Audiovisual Speaker Localization in Medium Smart Meeting Room," IEEE ICICS 8th International Conference, Dec. 2011, 5 pp.

Wang, et al., "Voice Source Localization for Automatic Camera Pointing System in Videoconferencing," 1997 IEEE International Conference on Acoustics, Speech, and Signal Processing, vol. 1, 4 pp.

Sharma, "The Ultimate Guide to K-Means Clustering: Definition, Methods and Applications," Analytics Vidhya, Nov. 3, 2023, 19 pp.

International Search Report and Written Opinion for PCT/US2023/030647 dated Nov. 9, 2023, 11 pp.

Lathoud, et al., "Short-Term Spatio-Temporal Clustering Applied to Multiple Moving Speakers," IEEE Transactions on Audio, Speech, and Language Processing, vol. 15, No. 5, Jul. 2007, 15 pp.

Thiergart, et al., "Localization of Sound Sources in Reverberant Environments Based on Directional Audio Coding Parameters," Audio Engineering Society Convention 127, New York, Oct. 2009, 14 pp.

* cited by examiner

SYSTEM AND METHOD FOR CAMERA MOTION STABILIZATION USING AUDIO LOCALIZATION

CROSS-REFERENCE

This application claims priority to U.S. Provisional Application No. 63/371,982, filed on Aug. 19, 2022, the contents of which are being incorporated herein by reference in their entirety.

TECHNICAL FIELD

This disclosure generally relates to camera positioning based on talker location in an environment, and more specifically, to systems and methods for camera motion stabilization while using audio localization data obtained by one or more microphones to point a camera towards an active talker.

BACKGROUND

Various audio-visual environments, such as conference rooms, boardrooms, classrooms, video conferencing settings, and more, typically involve the use of microphones (including microphone arrays) for capturing sound from one or more audio sources in the environment (also known as a "near end") and loudspeakers for presenting audio from a remote location (also known as a "far end"). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. Multiple microphones may be used in order to optimally capture the speech and sound in the conference room.

Some environments may also include one or more image capture devices, such as cameras, which can be used to capture and provide images and video of persons and objects in the environment to be transmitted for viewing at the remote location. In such environments, the cameras may be configured to point the camera in the direction of an active talker, such as humans in the environment that are speaking or making other sounds, so that viewers at the remote location can see who is talking. Some cameras use motion sensors and/or facial recognition software in order to guess which person is talking for tracking purposes.

SUMMARY

The techniques of this disclosure provide systems and methods designed to, among other things: (1) dynamically cluster audio localization points obtained by a microphone over time based on proximity; and (2) use the clustered points to provide stabilized talker coordinates for smoothly driving camera motion while pointing a camera towards an active talker.

In an embodiment, a method comprises using at least one processor in communication with a camera and a microphone, the method comprising: determining a first talker location based on a first group of sound locations corresponding to audio detected by the microphone in association with one or more talkers; receiving a new sound location for new audio detected by the microphone in association with at least one talker; determining a proximity of the new sound location to the first group of sound locations; based on the new sound location being in close proximity to one or more of the sound locations in the first group, determining a second talker location based on the new sound location and the first group of sound locations; determining a second proximity of the second talker location to the first talker location; based on the second proximity meeting or exceeding a threshold, providing the second talker location to the camera to cause the camera to point an image capturing component of the camera towards the second talker location; and based on the second proximity not exceeding the threshold, providing the first talker location the camera to cause the camera to point the image capturing component towards the first talker location.

In another exemplary embodiment, a system comprises a microphone configured to: detect audio in association with one or more talkers, and provide a first group of sound locations corresponding to the audio; and detect new audio in association with at least one talker, and provide a new sound location corresponding to the new audio. The system further comprises a camera comprising an image capturing component; and one or more processors in communication with the microphone and the camera, the one or more processors configured to: determine a first talker location based on the first group of sound locations; determine a proximity of the new sound location to the first group of sound locations; based on the new sound location being in close proximity to one or more of the sound locations in the first group, determine a second talker location based on the new sound location and the first group of sound locations; determine a second proximity of the second talker location to the first talker location; based on the second proximity meeting or exceeding a threshold, provide the second talker location to the camera; and based on the second proximity not exceeding the threshold, providing the first talker location the camera, wherein the camera is configured to: point the image capturing component towards the second talker location upon receipt of the second talker location, and point the image capturing component towards the first talker location upon receipt of the first talker location.

In yet another exemplary embodiment, a non-transitory computer-readable storage medium comprises instructions that, when executed by at least one processor in communication with a microphone and a camera, cause the at least one processor to perform: determining a first talker location based on a first group of sound locations corresponding to audio detected by the microphone in association with one or more talkers; receiving a new sound location for new audio detected by the microphone in association with at least one talker; determining a proximity of the new sound location to the first group of sound locations; based on the new sound location being in close proximity to one or more of the sound locations in the first group, determining a second talker location based on the new sound location and the first group of sound locations; determining a second proximity of the second talker location to the first talker location; based on the second proximity meeting or exceeding a threshold, providing the second talker location to the camera to cause the camera to point an image capturing component of the camera towards the second talker location; and based on the second proximity not exceeding the threshold, providing the first talker location the camera to cause the camera to point the image capturing component towards the first talker location.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
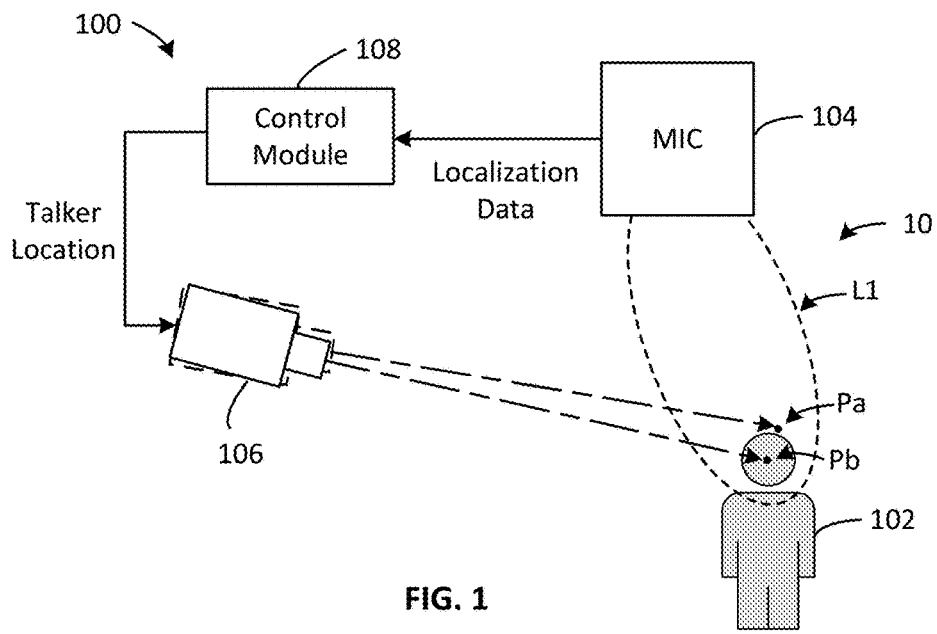
FIG. 1 is a schematic diagram of an exemplary environment comprising an audio-visual system that can be utilized to drive camera motion for pointing a camera towards an active talker based on audio localization data, in accordance with one or more embodiments.

The systems and methods described herein can improve the configuration and usage of audio-visual systems, such as, e.g., conferencing systems, gaming systems, and others, by using audio localization information gathered by a microphone (or microphone array) over time for a given environment to estimate the location of an active talker in the environment, position a camera towards the active talker, and smoothly and steadily drive camera motion while pointing the camera towards the talker. As an example, the microphone can detect the locations of one or more talkers or other audio sources in the environment using an audio localization algorithm and provide the corresponding audio localization data, or coordinates, to a control module. The control module can determine or estimate a location of an active talker based on the audio localization data and provide the estimated talker location to the camera, so that the camera can be oriented towards the active talker.

Audio localization data typically contains azimuth, elevation, and radius coordinates representing an estimated location of the talker or other audio source relative to a center of the microphone. While the localization coordinates are relatively accurate estimates, they are not perfectly precise due to various factors, including limited angle of arrival resolution, uncertainties due to room reverberation, possible skew due to various room noises, and more. For example, the azimuth and/or elevation coordinates may deviate by at least several degrees from the actual talker position over time. In addition, even when the localization coordinates are fairly close to the actual coordinates for an active talker's location at a given time, the received localization data may deviate, at least slightly, from a real-time position of the talker due to, for example, the talker moving their head or body, shifting in their chair, rocking or swiveling the chair, and other slight movements, or micro-motions. Attempting to track and follow every movement of the talker, including these micro-motions, may result in moving the camera too often and too much, creating jitter and other unpleasant video effects. Thus, driving camera motion using raw localization coordinates that may not point exactly towards a talker may cause jerky or unsteady camera movements, thus resulting in video that ranges from mildly unpleasant to nearly impossible to watch.

The techniques described herein can improve an accuracy of a talker location provided to the camera and stabilize camera motion while pointing the camera towards an active talker in an environment by using audio localization coordinates obtained over time to estimate a "smoothed" or confirmed talker location for driving camera motion. Such techniques may also prevent the camera from being pointed in the direction of spurious noises present in the environment (e.g., footsteps, doors opening/closing, pens tapping, etc.). In addition, the techniques described herein may use a voice activity detector, or the like, to prevent the camera from being pointed in the direction of persistent stationary or non-stationary noises (e.g., HVAC, fans, papers rustling, etc.) or other noise source in the environment.

The smoothed talker location can be provided to the camera for positioning an image capturing component of the camera towards the talker. The coordinates of the smoothed talker location may be converted to a coordinate system that is relative to the camera, or to a previously-determined common coordinate system (e.g., a coordinate system that is relative to the room), so that the camera receives the estimated talker location in a format that is understandable and useful to the camera. The camera can utilize the received talker location for moving, zooming, panning, framing, or otherwise adjusting the image and video captured by the camera. In this manner, the systems and methods described herein can be used by an audio-visual system to enable a camera to more accurately and steadily point or be positioned towards an active talker, for example.

As used herein, the terms "lobe" and "microphone lobe" refer to an audio beam generated by a given microphone array (or array microphone) to pick up audio signals at a select location, such as the location towards which the lobe is directed. While the techniques disclosed herein are described with reference to microphone lobes generated by array microphones, the same or similar techniques may be utilized with other forms or types of microphone coverage (e.g., a cardioid pattern, etc.) and/or with microphones that are not array microphones (e.g., a handheld microphone, boundary microphone, lavalier microphones, etc.). Thus, the term "lobe" is intended to cover any type of audio beam or coverage.

FIG. 1 depicts an exemplary environment 10 in which one or more of the systems and methods disclosed herein may be used. As shown, the environment 10 comprises an audio-visual system 100 that can be utilized to determine a location of a talker 102 in the environment 10 for camera positioning purposes based on detected audio, in accordance with embodiments. It should be understood that while FIG. 1 illustrates one potential environment, the systems and methods disclosed herein may be utilized in any applicable environment, including but not limited to classrooms, conference rooms, offices, huddle rooms, theaters, arenas, music venues, etc.

As shown, the audio-visual system 100 comprises a microphone 104, a camera 106, and a control module 108. In general, the microphone 104 detects audio present in the environment 10, including audio associated with an active talker, such as talker 102, and any other audio sources, and provides audio localization coordinates for the detected audio to the control module 108. The control module 108 estimates a location of the talker 102 based on the audio localization data received from the microphone 104 over time and provides the estimated talker location to the camera 106 for positioning the camera 106 towards the talker 102. To help keep camera motion steady and improve an accuracy of the estimated talker location, the control module 108 uses clustering techniques to identify a cluster of audio localization points that is likely to be associated with the talker 102, and calculates the estimated talker location based on that cluster, rather than an individual localization point. Upon receiving a new talker location (e.g., point Pb in FIG. 1), the camera 106 shifts a position (e.g., angle, tilt, direction, zoom, etc.) of an image capturing component of the camera 106 from a current position that is directed towards a previous talker location (e.g., point Pa in FIG. 1) to a new position that is directed towards the new talker location (e.g., point Pb in FIG. 1). As a result, the camera 106 may be configured to smoothly and steadily follow the active talker 102 as they move about the environment, including, for example, if they move to one side of their seat or go from sitting to standing, or vice versa, so that the active talker is always within a frame or viewing angle of the camera 106 and camera positioning is achieved without jerky or unsteady movements.

In various embodiments, the system 100 may also include various components not shown in FIG. 1, such as, for example, one or more loudspeakers, tabletop or other types of microphones, display screens, computing devices, and/or additional cameras. In addition, one or more of the components in the system 100 may include one or more digital signal processors or other processing components, controllers, wireless receivers, wireless transceivers, etc. The environment 10 may also include one or more other persons, besides the talker 102, and/or other objects (e.g., musical instruments, phones, tablets, computers, HVAC equipment, etc.) that are not shown. It should be understood that the components shown in FIG. 1 are merely exemplary, and that any number, type, and placement of the various components in the environment 10 are contemplated and possible.

Each component of the audio-visual system 100, including the microphone 104, the camera 106, and the control module 108, may be in wired or wireless communication with one or more other components of the system 100. In some embodiments, the control module 108 and the camera 106 may communicate via a suitable application programming interface (API), which may enable the camera 106 to query the control module 108 for the location of the microphone 104, enable the control module 108 to transmit signals to the camera 106, and/or enable the camera 106 to transmit signals to the control module 108. For example, in some cases, the control module 108 may transmit the talker location to the camera 106 in response to a query from the camera 106 over the API. Similarly, the microphone 104 may be configured to communicate with the control module 108 using a suitable API, which may enable the microphone 104 to transmit localization coordinates to the control module 108 upon receiving a query from the control module 108.

The microphone 104 can be a microphone array (also referred to as "array microphone") or any other type of microphone capable of generating audio localizations, including a non-array microphone, such as a directional microphone (e.g., lavalier, boundary, etc.) and others. The type, number, and placement of microphone(s) in a particular environment may depend on the locations of the audio sources, listeners, physical space requirements, aesthetics, room layout, stage layout, and/or other considerations. For example, one or more microphones may be placed on a table, lectern, or other surface near the audio sources or attached to the audio sources, e.g., a performer. One or more microphones may also be mounted overhead or on a wall to capture the sound from a larger area, e.g., an entire room. The microphone 104 shown in FIG. 1 may be placed in any suitable location, including on a wall, ceiling, table, and/or any other surface in the environment 10. Similarly, loudspeakers may be placed on a wall, ceiling, or table surface in order to emit sound to listeners in the environment 10, such as sound from the far end of a conference, pre-recorded audio, streaming audio, etc. The microphones and loudspeakers may conform to a variety of sizes, form factors, mounting options, and wiring options to suit the needs of particular environments. In the illustrated embodiment, the microphone 104 may be positioned at a select location in the environment 10 in order to adequately capture sounds throughout the environment 10.

In cases where the environment 10 is a conference room, the environment 10 can be used for meetings, conference calls, or other events where local participants in the room communicate with each other and/or with remote participants. In such cases, the microphone 104 can detect and capture sounds from audio sources within the environment 10. The audio sources may be the local participants, e.g., human talker 102 shown in FIG. 1, and the sounds may be speech spoken by the local participants, or music or other sounds generated by the same. In a common situation, the local participants may be seated in chairs at a table, although other configurations and locations of the audio sources are contemplated and possible.

The camera 106 can capture still images and/or video of the environment 10 in which the audio-visual system 100 is located. In some embodiments, the camera 106 may be a standalone camera, while in other embodiments, the camera 106 may be a component of an electronic device, e.g., smartphone, tablet, etc. In some cases, the camera 106 may be included in the same electronic device as one or more of the control module 108 and the microphone 104. The camera 106 may be a pan-tilt-zoom (PTZ) camera that can physically move and zoom to capture desired images and video, or may be a virtual PTZ camera that can digitally crop and zoom images and videos into one or more desired portions. The system 100 may also include a display, such as a television or computer monitor, for example, for showing other images and/or video, such as the remote participants of a conference call or other image or video content. In some embodiments, the display may include one or more microphones, cameras, and/or loudspeakers, for example, in addition to or including the microphone 104 and/or camera 106.

As shown in FIG. 1, the control module 108 can be configured to receive audio localization data generated by the microphone 104 based on detected audio, determine a talker location based on the received localization data and using the techniques described herein, and provide the talker location to the camera 106 for controlling camera movement. The control module 108 may be implemented in hardware, software, or a combination thereof. In some embodiments, the control module 108 may be a standalone device, such as a controller, control device, or other electronic device, or included in such a device. In other embodiments, all or portions of the control module 108 may be included in the microphone 104 and/or the camera 106.

Figure 2:
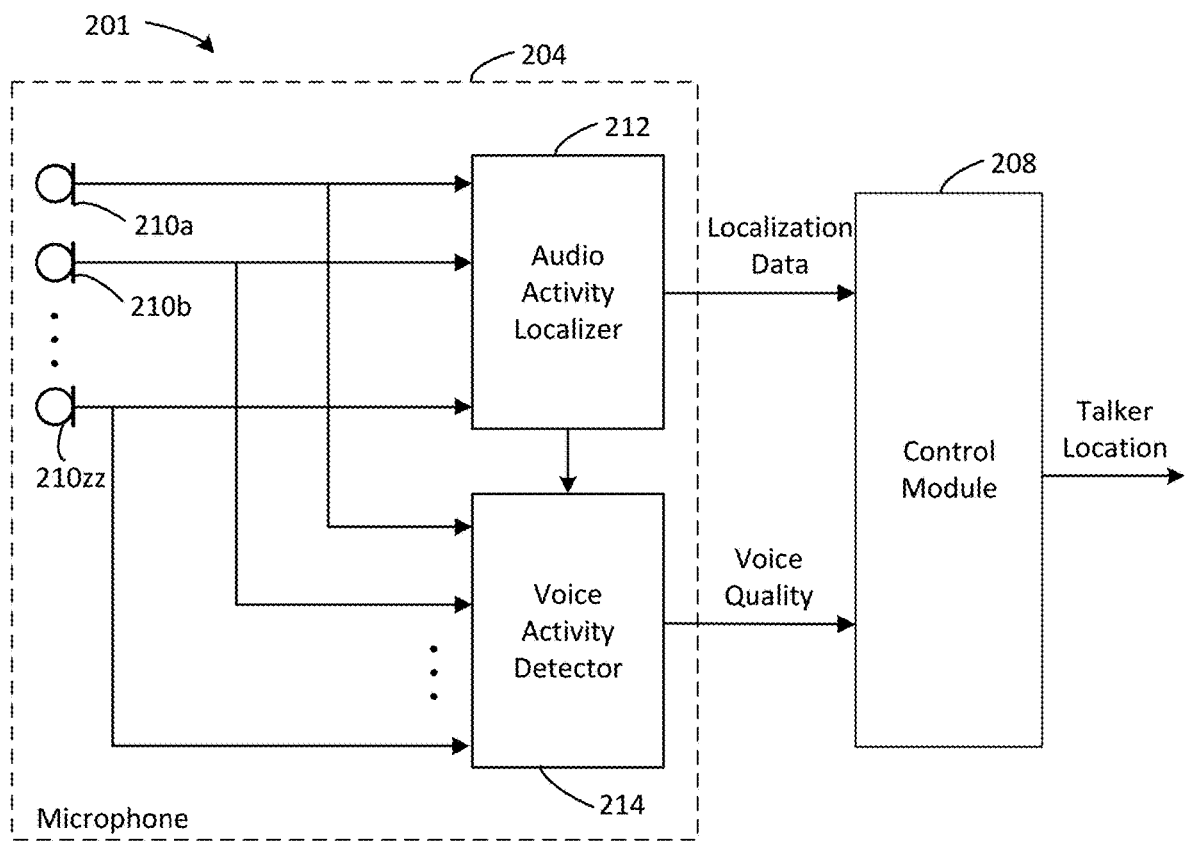
FIG. 2 is a block diagram of an exemplary audio system configured to determine an active talker location based on audio localization data obtained by a microphone for use in the environment of FIG. 1, in accordance with one or more embodiments.

Referring additionally to FIG. 2, shown is an exemplary audio system 201 that may be usable with the audio-visual system 100 in environment 10, in accordance with embodiments. In particular, the audio system 201 comprises a microphone array 204 that may be usable as the microphone 104 of FIG. 1 and a control module 208 that may be usable as the control module 108 of FIG. 1. The microphone array 204 may be configured to form one or more pickup patterns with lobes that can be steered to sense or detect audio in particular locations within an environment.

As shown, the microphone array 204 comprises a plurality of microphone elements 210a,b, . . . zz (or microphone transducers) and can form one or more pickup patterns with lobes (e.g., L1 in FIG. 1), so that sound from audio sources, such as sounds produced by the human talker 102 or other objects or talkers in the environment 10, can be detected and captured. In some embodiments, each of the microphone elements 210a,b, . . . , zz may be a MEMS (micro-electrical mechanical system) microphone with an omnidirectional pickup pattern. In other embodiments, the microphone elements 210a,b, . . . , zz may have other pickup patterns and/or may be electret condenser microphones, dynamic microphones, ribbon microphones, piezoelectric microphones, and/or other types of microphones. In various embodiments, the microphone elements 210a,b, . . . , zz may be arrayed in one dimension or multiple dimensions.

The audio signals output by the microphone elements 210a,b, . . . , zz may correspond to one or more pickup patterns. The pickup patterns may be composed of, or include, one or more lobes (e.g., main, side, and back lobes) and/or one or more nulls. The pickup patterns that can be formed by the microphone array 204 may be dependent on the type of beamformer used with the microphone elements. For example, a delay and sum beamformer may form a frequency-dependent pickup pattern based on its filter structure and the layout geometry of the microphone elements. As another example, a differential beamformer may form a cardioid, subcardioid, supercardioid, hypercardioid, or bidirectional pickup pattern. Other suitable types of beamformers may include a minimum variance distortionless response ("MVDR") beamformer, and more.

In some embodiments, each microphone element 210a,b, . . . , zz can detect sound and convert the detected sound to an analog audio signal. In such cases, other components in the microphone array 204, such as analog to digital converters, processors, and/or other components (not shown), may process the analog audio signals and ultimately generate one or more digital audio output signals. The digital audio output signals may conform to suitable standards and/or transmission protocols for transmitting audio. In other embodiments, each of the microphone elements 210a, b, . . . , zz in the microphone array 204 may detect sound and convert the detected sound to a digital audio signal.

The microphone array 204 further comprises an audio activity localizer 212 that is configured to determine a location or position of an audio source, relative to the array 204 (or more specifically, a coordinate system of the array 204), based on sound, or audio activity, generated by the audio source and detected by the microphone elements 210a,b, . . . , zz. The detected audio activity may include one or more audio sources, such as human talkers (e.g., talker 102 in FIG. 1), noise sources, or an acoustical trigger from or near a camera, e.g., camera 106 in FIG. 1. The audio activity localizer 212 may calculate or estimate a set of localization coordinates that represents the location of the detected audio activity in an environment (e.g., the environment 10 of FIG. 1), based on audio signals received from the microphone elements 210a,b, . . . , zz, or otherwise localize audio detected by the microphone array 204. The audio activity localizer 212 may be in wired or wireless communication with each of the microphone elements 210a,b, . . . , zz.

In embodiments, the audio activity localizer 212 may utilize a Steered-Response Power Phase Transform (SRP-PHAT) algorithm, a Generalized Cross Correlation Phase Transform (GCC-PHAT) algorithm, a time of arrival (TOA)-based algorithm, a time difference of arrival (TDOA)-based algorithm, Multiple Signal Classification (MUSIC) algorithm, an artificial intelligence-based algorithm, a machine learning-based algorithm, or another suitable audio or sound source localization algorithm to determine a direction of arrival of the detected audio activity and generate an audio localization or other data that represents the location or position of the detected sound relative to the microphone array 204. As will be appreciated, the location obtained by the sound source localization algorithm may represent a perceived location of the audio activity or other estimate obtained based on the audio signals received from the microphone elements 210a,b, . . . , zz, which may or may not coincide with the actual or true location of the audio activity.

The audio activity localizer 212 may be configured to indicate the location of the detected audio activity as a set of three-dimensional coordinates relative to the location of the microphone array 204, or in a coordinate system where the microphone array 204 is the origin of the coordinate system. The coordinates may be Cartesian coordinates (i.e., x, y, z), or spherical coordinates (i.e., azimuthal angle φ (phi or "az"), elevation angle θ (theta or "elev"), radial distance/magnitude (R)). It should be noted that Cartesian coordinates may be readily converted to spherical coordinates, and vice versa, as needed. The spherical coordinates may be used in various embodiments to determine additional information about the audio-visual system 100 of FIG. 1, such as, for example, a distance between the audio source 102 and the microphone 104, a distance between the microphone 104 and the camera 106, and/or relative locations of the camera 106 and/or the microphone 104 within the environment 10.

In the illustrated embodiment, the audio activity localizer 212 is included in the microphone array 204. In other embodiments, the audio activity localizer 212 may be a standalone component. In still other embodiments, the audio activity localizer 212 may be included in another component of the audio system 201, such as, e.g., the control module 208. In various embodiments, detected talker locations, or more specifically, localization coordinates or data representing each location, may be transmitted to one or more other components of the audio system 201 and/or the audio-visual system 100, such as the control module 208 of FIG. 2 and/or the camera 106 of FIG. 1. The audio activity localizer 212 may be in wired or wireless communication with the control module 208.

In various embodiments, the location data generated by the audio activity localizer 212 may also include a timestamp or other timing information to indicate the time at which the coordinates were generated, an order in which the coordinates were generated, and/or any other information to help identify a temporal age of the coordinates. In some embodiments, the microphone array 204 includes a clock for generating the timing information (e.g., using Network Time protocol or the like). In other embodiments, the timing, or simultaneous output, of the coordinates may be determined using other techniques, such as, for example, setting up a time-synchronized data channel for transmitting the localization data from the microphone array 204 to the control module 208, and more.

Figure 3:
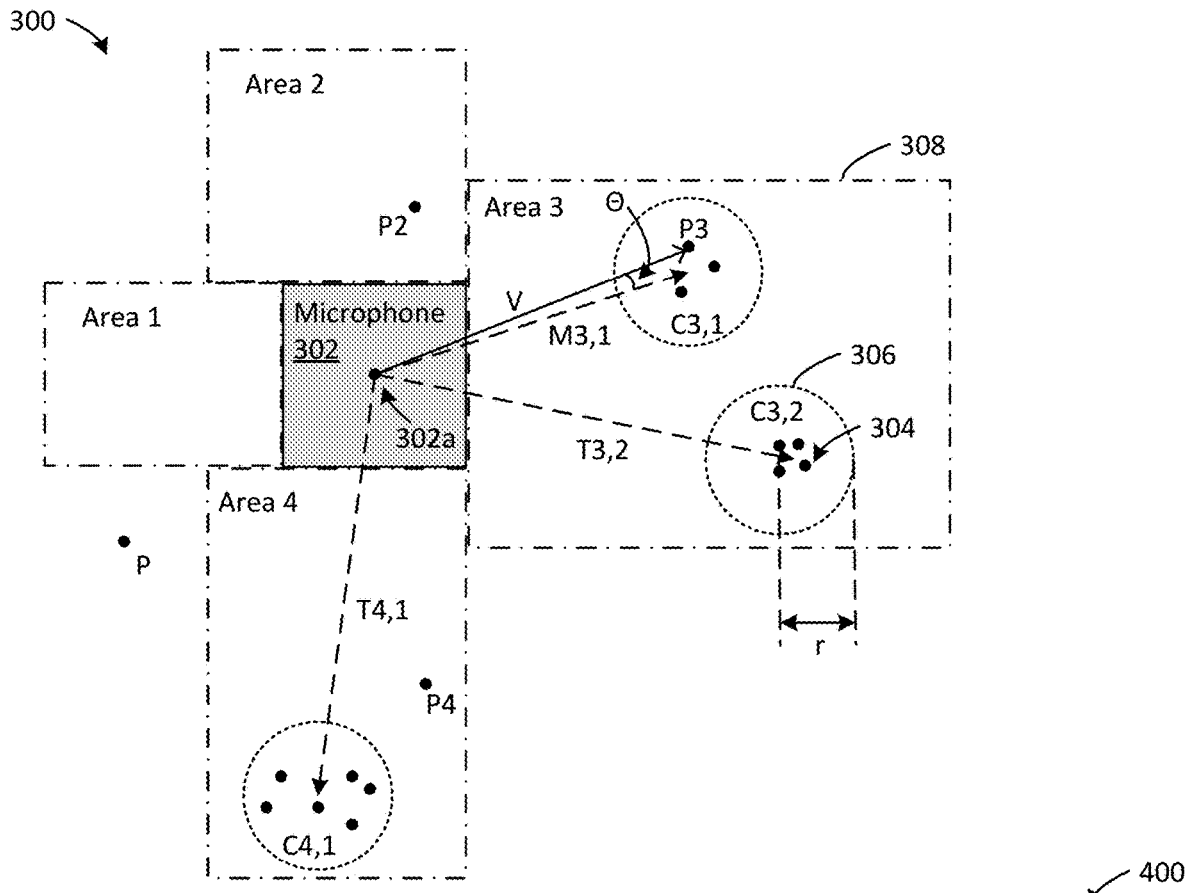
FIG. 3 is a plot diagram of exemplary localization points obtained by a microphone and application of a clustering technique thereto, in accordance with one or more embodiments.

The control module 208 can determine an estimated location of an active talker in the environment based on audio localization data received over time from the audio activity localizer 212. The control module 208 may receive the audio localization data from the localizer 212 in real time, or nearly real time, and may store the received data in a memory of the control module 208 and/or the audio system 201. The control module 208 can be configured to sort the individual localization points included in the received data into groups, or clusters, based on, for example, distance or proximity to a center of the microphone array 204 or other common point. The clusters may grow over time as new localization points are received and added to the collection. Once a threshold number, N, of localization points have been collected, one or more of the clusters may be large enough to accurately represent a unique talker or other audio source in the environment. Accordingly, the control module 208 can use this collection to determine whether a new localization point received from the audio activity localizer 212 is likely to be audio associated with an active talker (e.g., because it belongs to an existing cluster of points), or an outlier (e.g., because it is does not belong to any of the clusters) that should not be used to determine the talker location. In this manner, the control module 208 can ensure that only "confirmed talker" coordinates are used to estimate the talker location, thus providing more accurate camera positioning and as a result, steadier camera movements. These and other techniques for obtaining a smoothed talker location are shown in FIG. 3 and described in more detail below.

In some embodiments, the control module 208 and/or the audio activity localizer 212 can be configured to check an accuracy of the localization points before applying the clustering techniques, to further ensure that only confirmed talker coordinates are used to estimate the talker location. In such cases, the control module 208 and/or the audio activity localizer 212 may use steered response power ("SRP") or other appropriate metric to measure a localization quality of each point, or otherwise determine how well the calculated location represented by each localization point matches the actual location-related data used to calculate the talker location. For example, each localization point may be assigned a location score based on its SRP level, and the location score may be compared to a localization quality threshold to determine whether the localization point is of high quality (e.g., meets or exceeds the threshold) or low quality (e.g., below the threshold). Localization points that are below the threshold may be ignored or otherwise removed from the location data used to calculate the talker location for camera positioning purposes.

In some embodiments, the localization quality threshold used to determine whether the new audio is a valid localization point for camera positioning may be different from the localization quality threshold that is used to determine whether the new audio is a valid localization point for lobe deployment (e.g., deploying an audio pick-up lobe towards a detected talker). For example, the threshold used for camera positioning purposes may be higher, and thus more precise, than the threshold used for lobe deployment, where speed is more important than accuracy. As will be appreciated, a higher threshold means lower sensitivity (e.g., SRP sensitivity) and thus, fewer localization points and a slower response, which leads to better quality, whereas a lower threshold means higher sensitivity and thus, more localizations and faster response, which leads to less precise localizations and may include more spurious noise. In some cases, the localization quality threshold used for camera positioning may be adjustable in order to allow accommodations for a highly reverberant environment. For example, the threshold may be lowered so that the sensitivity is higher and thus, reverberations are not captured as localization points.

In various embodiments, the microphone array 204 may also include a voice activity detector 214 (or "VAD") that is in wired or wireless communication with each of the microphone elements 210a,b, ... zz in order to receive audio (or audio signals) detected by the microphone elements 210a,b, ... zz. The VAD 214 may be configured to determine a voice quality of the audio signals detected by the microphone elements 210a,b, ... zz, in order to help differentiate human speech or voice from errant non-voice or non-human noises in the environment, such as, e.g., shuffling of papers, opening of bags and containers, typing, chewing, etc. For example, the VAD 214 may use a voice activity detection algorithm or other similar speech processing algorithm to detect the presence or absence of human speech or voice in an audio signal. As shown in FIG. 2, the VAD 214 may be configured to output or provide a voice quality metric, or confidence score, for the detected audio to the control module 208 that indicates whether voice or noise is present in the detected audio. As an example, the voice quality metric may be a numerical score that indicates a relative strength of the voice activity found in the detected audio (e.g., on a scale of 1 to 5), a binary value that indicates whether voice is found (e.g., "1") or noise is found (e.g., "0"), or any other suitable measure. In various embodiments, the VAD 214 may be implemented by analyzing the harmonicity or spectral variance of the audio signals, using linear predictive coding ("LPC"), applying machine learning or deep learning techniques to detect voice, and/or using well-known techniques such as the ITU G.729 VAD, ETSI standards for VAD calculation included in the GSM specification, or long term pitch prediction.

In various embodiments, the VAD 214 may also be in wired or wireless communication with the audio activity localizer 212 in order to receive the audio localization data, or localization coordinates, determined by the audio activity localizer 212, in addition to the audio signals detected by the microphone elements 210a,b, ..., zz. The VAD 214 may be configured to assess the voice quality of the audio signal(s) associated with each set of localization coordinates, and determine a voice quality metric for the associated localization coordinates (or point).

As shown, the VAD 214 is also in wired or wireless communication with the control module 208 in order to provide the voice quality metric to the control module 208. The control module 208 may be configured to use the voice quality metrics received from the VAD 214 to determine which of the localization points received from the localizer 212 corresponds to voice activity. In addition, the control module 208 may be configured to use only the localization points that are the result of human speech or voice to determine a talker location (or the location of an active talker). For example, the control module 208 may ignore or delete any localization points that are identified as the result of noise activity or non-voice activity, or otherwise ensure that the noise sources are not factored into the talker location determination.

Referring again to FIG. 1, in various embodiments, the talker location determined by the control module 108 based on the audio localization data received from the microphone 104, may be relative to a coordinate system of the microphone 104 that captured the underlying audio signals. In some embodiments, the control module 108 may include a conversion unit configured to convert the talker location from its original coordinate system (e.g., relative to the microphone 104) to another coordinate system that is readily usable by the camera 106, prior to transmitting the talker location to the camera 106. For example, the conversion unit may be configured to convert localization coordinates in a first coordinate system that is relative to the microphone 104 (e.g., where the microphone 104 is the origin of the first coordinate system) to localization coordinates in a second coordinate system that is relative to the camera 106 (e.g., where the camera 106 is the origin of the second coordinate system). As another example, the conversion unit may be configured to convert localization coordinates received at the control module 108 to a common coordinate system associated with the environment 10, such as, e.g., a coordinate system that is relative to the room in which the audio-visual system 100 is located, so that the location data is readily usable by any component of the audio-visual system 100. In some embodiments, one or more components of the audio-visual system 100 (e.g., the microphone 104 and/or the camera 106) may include a conversion unit for converting any received localization coordinates to the coordinate system of that component or to a common coordinate system for the environment 10. In some embodiments, the conversion unit may be configured to derive a coordinate-system transformation for converting a given talker location from the original coordinate system to a coordinate system of the receiving component, or other common coordinate system of the environment 10, using, for example, known locations of the microphone 104 and the camera 106 relative to each other and/or the environment 10.

It should be understood that the components shown in FIGS. 1 and 2 are merely exemplary, and that any number, type, and placement of the various components of the audio-visual system 100, the microphone array 204, and/or the audio system 201 are contemplated and possible. For example, in FIG. 1, there may be multiple cameras 106 and/or a camera controller coupled between the camera(s) 106 and the control module 108.

Referring now to FIG. 3, shown is an exemplary map 300 for graphically illustrating certain dynamic audio localization clustering techniques that can be used to determine a more accurate talker location for camera positioning and thus, help provide smooth and steady camera movements while pointing a camera towards an active talker in an environment, in accordance with embodiments. The dynamic audio localization clustering techniques may be carried out by a control module of an audio-visual system (e.g., control module 108 of FIG. 1) using audio localization data received over a select time period from a microphone 302 included in the same system (e.g., microphone 104 of FIG. 1). The audio localization data may include localization coordinates that, when plotted on the map 300, appear as a plurality of points 304 (or localization points), for example, as shown in FIG. 3. That is, each audio localization point 304 shown in FIG. 3 may correspond to a set of coordinates that represents a localization of audio detected by the microphone 302, or a perceived or estimated location of a source of the detected audio. The localization coordinates may be in any suitable format, such as, e.g., spherical (e.g., x, y, z) or Cartesian (e.g., azimuth, elevation, radius).

According to embodiments, the dynamic audio localization clustering techniques can be used to sort or group a known collection of audio localization points 304 into various clusters 306 during an initialization stage (e.g., method 400 of FIG. 4), and can be used during a usage or maintenance stage (e.g., method 500 of FIG. 5) to determine whether new or incoming localization points 304 should be added to an existing cluster 306. More specifically, the techniques described herein may be used to improve a quality of the localization data that is used for camera positioning by only transmitting the coordinates that are in a predetermined vicinity of any current talker locations and/or have been detected as voice activity (e.g., high voice quality) in order to prevent the localization of noise in the environment.

In addition, the techniques described herein may be used to improve a quality of the video output by the camera by keeping the camera position steady and smoothing camera motion as the talker moves about within the environment. For example, the control module may be configured to filter out (or not transmit) successive localization coordinates of nearby positions or other micro-changes, due to, for example, auto-focus activity of a particular lobe, and thereby, minimizing jitteriness of the camera 106 as an active talker makes small movements (e.g., using their head, mouth, body, hands, etc.) or exhibits other minor shifts their position (e.g., rocking or swiveling in their chair, etc.). Furthermore, the control module may be configured to wait for localization data that indicates a significant movement of, or considerable change in, the detected talker location before sending a new talker location to the camera 106 or otherwise re-positioning the camera 106 to the new location. In some cases, until a new talker location is determined, a constant value, or the same value, may be provided to the camera 106 to prevent or minimize jitteriness.

In various embodiments, the audio localization points 304 can be grouped into a plurality of clusters 306 (e.g., by the control module) based on a proximity between the localization points 304, a proximity between each point 304 and a center 302a of the microphone 302, and/or other measurement for identifying the localization points 304 that correspond to the same relative location within the environment. The localization points 304 that are grouped into a given cluster 306 may be used to determine a talker location, T, that corresponds to that cluster 306, while the points 304 that fall outside the cluster 306 (e.g., point P4) may be treated as outliers (e.g., due to spurious noise, reflection, etc.) and thus, ignored for the purposes of determining talker location. The talker location, T, estimated for the cluster 306 may represent a current location of an active talker or other audio source that generated the audio represented by the cluster 306. Depending on the content of the cluster 306, the current talker location may be a new location (e.g., where the talker has moved) or a prior location (e.g., where the talker has not moved). In various embodiments, a given cluster 306 may not be used to estimate the talker location, T, until the cluster 306 includes a threshold number of points 304 (e.g., at least three, at least five, etc.), to help ensure that the cluster 306 corresponds to talker activity and not noise activity.

The talker location, T, may be estimated for a given cluster 306 by identifying a representative set of coordinates for the cluster 306 based on the localization points 304 included in the cluster 306. The representative coordinates may be determined, for example, by calculating a median, mean, or average of the corresponding localization points 304 (or the coordinates associated with each point 304), identifying a point of minimum distance between the localization points 304 included in the cluster 306, or otherwise identifying the coordinates that correspond to a midpoint of the cluster 306. The talker location, T, estimated based thereon may be provided to the camera of the audio-visual system for positioning the camera towards the active talker, as described herein.

Various linear-algebraic techniques may be used to calculate or determine the estimated talker location, T, described herein. According to some embodiments, when determining whether two localization points 304 should be grouped into the same cluster 306, the control module may determine a proximity between the two points 304 based on a straight line distance (e.g., Euclidean distance) between the two points 304 and/or any other suitable technique for identifying the localization points 304 that are situated in close proximity to each other. For example, a first point 304 and a second point 304 may be grouped into the same cluster 306 upon determining that a straight line distance between the two points 304 is less than a threshold distance (such as, e.g., 0.75 meter (m)).

In some embodiments, the proximity between two localization points 304 may also be determined based on whether the points 304 fall within the bounds of the same cluster 306. For example, in FIG. 3, each cluster 306 is shown as having a circular boundary that is centered on the cluster 306 and has a preset radius, r (e.g., 0.75 m). In such cases, a given set of localization points 304 may be considered to be in close proximity to each other, and therefore may be grouped into the same cluster 306, if the two points 304 fall within the same circular boundary and/or are no more than a threshold distance from a center of the circle formed by the boundary, wherein the threshold distance is equivalent to the radius, r, of the circle. As new localization points 304 are added to the cluster 306, the center of the corresponding boundary may shift dynamically to accommodate the updated group of points 304. In some cases, this shift may cause one or more existing points 304 to fall outside the updated boundary of the cluster 306 and thus, be removed from the calculation of a talker location. Likewise, the shift in cluster center may also cause one or more existing points 304 to be added to the updated cluster 306 and thus, added to the calculation of a talker location. In this manner, the talker location provided for camera positioning can be dynamically updated as the active talker, or other audio source, moves about the environment.

Figure 7:
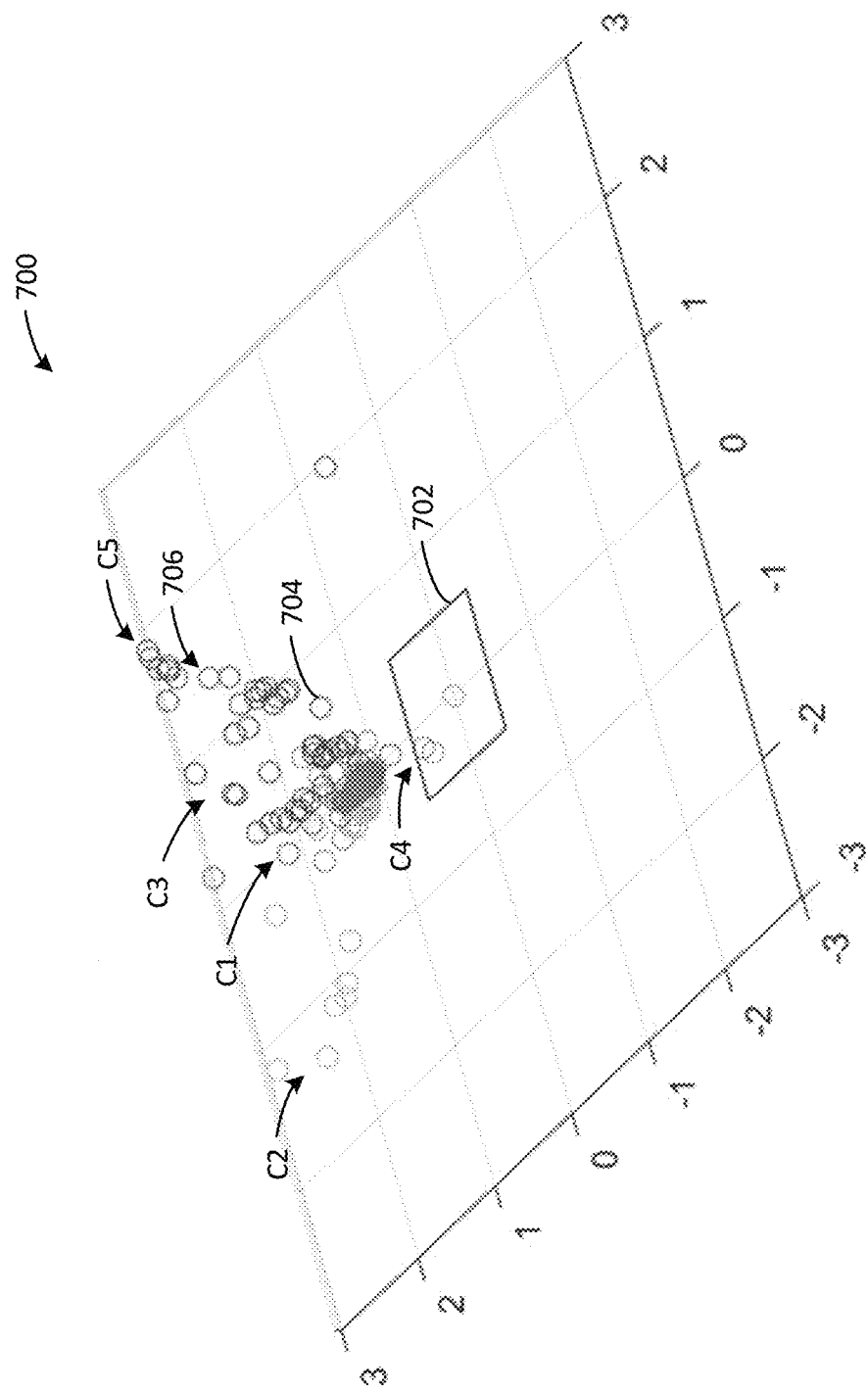
FIG. 7 is a three-dimensional diagram of exemplary localization points obtained by a microphone using the second clustering technique, in accordance with one or more embodiments.

It should be appreciated that while the map 300 shown in FIG. 3 is a two-dimensional plot for ease of illustration, the map 300 may also be represented as a three-dimensional plot (e.g., as shown in FIG. 7), since the plurality of localization points 304 are locations in a three-dimensional space (e.g., the room or other environment). When represented in three dimensions, the boundary for each of the clusters 306 may appear as a sphere, instead of the circles depicted in FIG. 3. Such spherical boundary may still be centered on the cluster 306 and have the same preset radius, r. In such cases, a given set of localization points 304 may be considered to be in close proximity to each other and therefore, may be grouped into the same cluster 306, if the two points 304 fall within the boundaries of the same sphere and/or are no more than a threshold distance from a center of the sphere formed by the boundary, wherein the threshold distance is equivalent to the radius, r, of the sphere.

In some embodiments, a given localization point 304 may be grouped or clustered with one or more other localization points 304 based on the proximity between a given localization point 304 and the microphone center 302a. In such cases, the proximity between the point 304 and the center 302a may be determined based on a straight line distance (e.g., Euclidean distance) between the center 302a and the point 304, a direction of arrival associated with the localization point 304, a direction vector pointing from the microphone center 302a to the localization point 304, or any other suitable technique for identifying the localization points 304 that are situated in the same general vicinity of the environment. For example, as shown in FIG. 3, a given localization point, P3, may have a direction vector, V, that starts at the microphone center 302a and ends at the localization point, P3. This direction vector, V, may be compared to one or more cluster vectors, M, to determine in which cluster, C, the point P3 belongs. The cluster vector, M, may be a vector that points from the microphone center 302a to a mean, median, average, center, centroid, midpoint or other representative coordinates of the corresponding cluster, C. In various embodiments, a given localization point 304 will be considered in close proximity to a given cluster, C, if an angle, Θ, between the direction vector, V, and the cluster vector M is less than (or within) a threshold number of degrees, D (e.g., 6 degrees). Accordingly, in FIG. 3, the localization point, P3, may be grouped with, or deemed to be in close proximity to, the other points 304 that form a cluster C3,1 based on a determination that the direction vector, V, of point P3 is within D degrees of the cluster vector, M3,1, of cluster C3,1.

Figure 6:
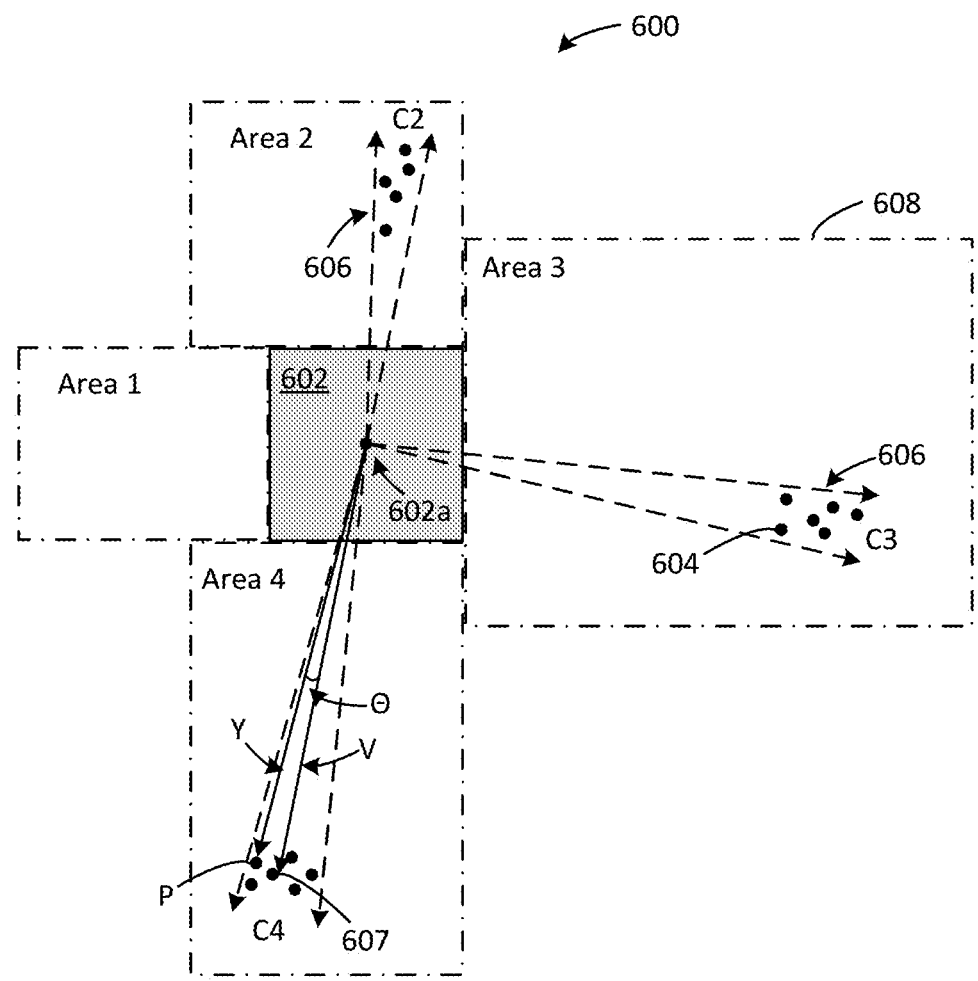
FIG. 6 is a plot diagram of exemplary localization points obtained by a microphone and application of a second clustering technique thereto, in accordance with one or more embodiments.

As described herein, the endpoint of the cluster vector, M, may also be used to determine a talker location, T, corresponding to that cluster, C. According to embodiments, as the cluster, C, dynamically adapts to accommodate new localization points 304 (e.g., due to the active talker moving about the environment), the cluster vector, M, may also shift or adapt accordingly. In some cases, this shift may cause one or more points 304 to fall outside of the cluster, C, for example, due to the corresponding direction vector, V, now being angled more than the threshold number of degrees, D, away from the updated cluster vector, M, or vice versa. This change in the composition of the cluster, C, may cause a corresponding shift in the cluster vector, M, as the midpoint of the cluster, C, changes to accommodate the points 304 that are now in the cluster, C, which may, in turn, cause a change in the talker location, T, that is estimated based on the cluster vector, M. In this manner, an estimated talker location, T, for a given cluster, C, may be dynamically updated as new audio is detected by the microphone 302 and added to the cluster, C, using direction vectors. Further description of the use of directionality to estimate talker location is shown in FIG. 6 and provided below with reference thereto.

In some cases, providing each new talker location to the camera may result in jerky or unsteady camera movements, for example, when the active talker moves so slightly (e.g., tilting their head, shifting in their seat, etc.) that re-positioning of the camera is not needed. In order to stabilize camera movements as an active talker makes such movements, the control module may be configured to withhold a newly estimated talker location, T, if the new location is not sufficiently different from the previous location. To make this determination, the control module may calculate a difference between the newly estimated talker location and a previous talker location, and compare the location difference to a distance threshold to determine if the new location is different enough to warrant re-positioning the camera. As an example, the difference between the two locations may be determined based on a straight line distance (e.g., Euclidean distance) between the two coordinates, a change in angle or direction (e.g., using direction vectors or the like) between the two coordinates, or any other suitable technique.

As shown in FIG. 3, in some embodiments, the environment may be divided into a plurality of areas 308 to facilitate the creation of clusters 306. The plurality of areas 308 may correspond to audio coverage (or pick-up) areas assigned to the microphone 302, lobes generated by the microphone 302 in order to pick up audio within the environment, quadrants formed around the microphone 302 to divide up the environment, and/or other regions for identifying broader locations within the environments. In some cases, the areas 308 may be Voronoi regions that consist of locations in space that are closest (e.g., in terms of Euclidean distance) to a center of a specific lobe or other area.

Each cluster 306 may be identified as being located in, or belonging to, a corresponding area 308 based on proximity (e.g., closest in terms of Euclidean distance) or other suitable criteria, and may be identified based on that area 308 (e.g., cluster C4,1 in Area 4). When a new localization point 304 is received (e.g., P2), the control module may first determine the area 308 in which the localization point 304 is located (e.g., Area 2). This may help narrow the search field, or pool of possible clusters 306, when determining in which cluster 306, if any, a given point 304 belongs. In some cases, a given area 308 may include multiple clusters 306 (e.g., clusters C3,1 and C3,2 in Area 3 of FIG. 3) if the control module identified multiple different audio source locations based on the received audio localization points 304. For example, in FIG. 3, clusters C3,1 and C3,2 may correspond to two talkers in the same Area 3. As another example, the two clusters C3,1, and C3,2 may correspond to a single talker moving, over time, to two separate locations within the Area 3.

FIG. 6 is another exemplary map 600 for graphically illustrating other dynamic audio localization techniques that are similar to the techniques shown in FIG. 3 and described above, except use directional or cone-shaped clusters in place of the spherical or circular clusters shown in FIG. 3. These directional dynamic audio localization techniques allow the clustering to happen naturally based on the localization data, instead of creating boundaries between localization points based on selected thresholds. For example, the directional techniques may be configured to automatically create clusters based on what is optimal for the set of localization points obtained by the microphone. In embodiments, the directional dynamic audio localization techniques may be better at removing outliers, especially in highly reflective environments and thus, may improve a resolution or quality of the clusters formed for a given set of localizations.

More specifically, the dynamic audio localization techniques shown in FIG. 6 may be carried out by a control module of an audio-visual system, like the techniques shown in FIG. 3. Also, like the map 300 in FIG. 3, the map 600 depicts the audio localization data obtained by a microphone 602 included in the audio-visual system as a plurality of localization points 604, each point corresponding to a set of coordinates (e.g., spherical or Cartesian) that represents a perceived or estimated location of a source of the detected audio. Also, like the dynamic audio localization techniques shown in FIG. 3, the techniques shown in FIG. 6 can be used to sort or group a collection of audio localization points 604 into appropriate clusters 606 during the initialization stage (e.g., method 400) and/or to determine whether a new localization point 604 should be added to an existing cluster 606. However, instead of forming spherical or circular clusters, as shown in FIG. 3, the control module may generate the clusters 606 using directional clustering techniques that group the audio localization points 304 into directional or cone-shaped clusters 606 based on proximity, as shown in FIG. 6. That is, each cluster 606 may include the points 304 that fall within a three-dimensional directionality defined by a conical shape, or the like, that extends out from a microphone center 602a. The size, shape, and direction of each "cluster-cone" 606 may vary depending on the number, distribution, and locations of the corresponding points 304, as shown by the three different clusters C2, C3, and C4 located in Areas 2, 3, and 4, respectively, in FIG. 6.

To further illustrate aspects of the cluster-cones, FIG. 7 provides a diagram 700 showing exemplary localization points 704 obtained by a microphone 702 and plotted in three-dimensional space. The points 704 have been grouped into at least five different clusters 706 based on directionality, namely C1, C2, C3, C4, and C5, as shown. As described further therein, the exact number of clusters 706 may vary depending on the number of points 704 and their distribution and location within the three-dimensional space (e.g., a conference room, auditorium, or other event space).

Referring back to FIG. 6, in various embodiments, the directional clustering algorithm may be configured to determine the proximity of a given point 604 to an existing cluster 606 or another point 604 based on the vectors that correspond to each of the points 604 and a center of the cluster 606. For example, as shown in FIG. 6, a point P may have a direction vector Y that extends from the microphone center 602a to the location of the point P, and a cluster C4 may be a central or centroid vector V that extends from the microphone center 602a to a central point 607 of the cluster C4. The point P may be assigned to, or included in, the cluster C4 upon determining that the direction vector Y minimally deviates from the central vector V, or has an angular deviation of $\Theta$ that is below a predetermined threshold.

Various techniques may be used to generate and fine-tune the directional clusters 606 based on proximity of the localization points 604, including, for example, a k-means clustering algorithm or the like. For example, in embodiments, the dynamic clustering algorithm may start with selecting a number of clusters, k, once the total number of points 604 is large enough to generate multiple clusters and fine-tune the cluster "landscape." The exact number, k, can vary. In some embodiments, the number of clusters, k, can be configured to be large enough to appropriately represent a total number of talkers in the room (e.g., ten to fifteen). The number of clusters, k, may change as points 604 are discarded after being identified as outliers, or clusters 606 are merged together after reaching convergence. The number of points 604 included in each cluster 606 may vary as well and may be one or more.

The dynamic clustering algorithm may further include randomly selecting k number of points from the plurality of points 604 to serve as the central points 607 for the k number of clusters 606. Each central point 607 is then used to form a respective cluster 606, for example, by assigning, to the corresponding cluster 606, the localization points 604 that are closest to that central point 607. As described herein, each central point 607 may have a unit-size vector, V, in three-dimensional space that represents, or extends in, a specific direction and ends at the selected point 604. In some cases, these central vectors may be considered to be the "centroids" of the clusters 606, since the clusters 606, themselves, are directional, as described herein. That is, the actual centroid of each cluster 606 may be a direction, instead of a point in three-dimensional space.

As mentioned above, the dynamic clustering algorithm may also include assigning each of the remaining localization points 604 to the central point 607 that is closest to it, and thus creating a cluster 606 around each central point 607. In embodiments, the proximity or distance between a central point 607 and another localization point 604 may be determined or calculated based on a deviation (e.g., angular deviation) from the centroid direction, or the deviation of the direction vector, Y, of the localization point 604 from the centroid vector, V. Once all of the points 604 are assigned to appropriate clusters 606, the algorithm may include recomputing the central point 607 for each cluster 606 based on the group of points 604 now assigned to that cluster 606.

In embodiments, the dynamic clustering algorithm may further include fine-tuning the clusters 606 by repeating the steps of assigning the points 604 to select central points 607, or centroid vectors V, based on proximity, and recomputing the central point 607 for each newly formed cluster 606 until certain stopping criteria are met. The stopping criteria may include, for example, no change in the central points 607, or centroid vector, for the newly formed clusters 606, the same set of points 604 remaining in each cluster 606, and/or reaching a maximum number of iterations (e.g., 10, etc.).

Figure 4:
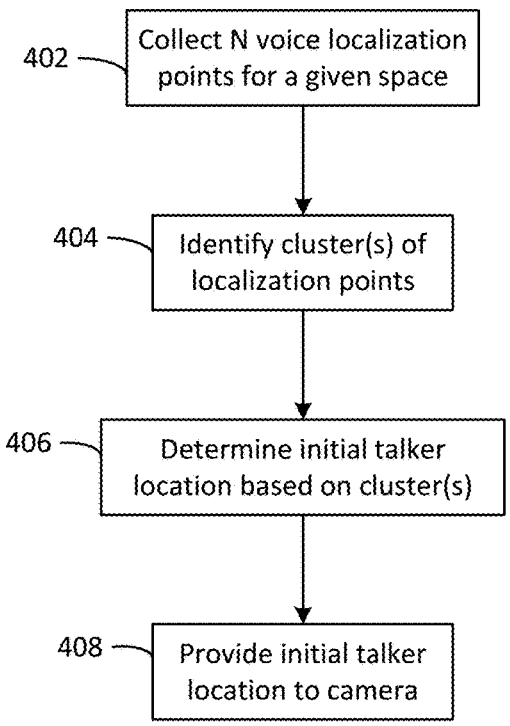
FIG. 4 is a flowchart illustrating exemplary operations for initializing an audio-visual system configured to steadily drive camera motion based on audio localization data obtained by a microphone, in accordance with one or more embodiments.
Figure 5:
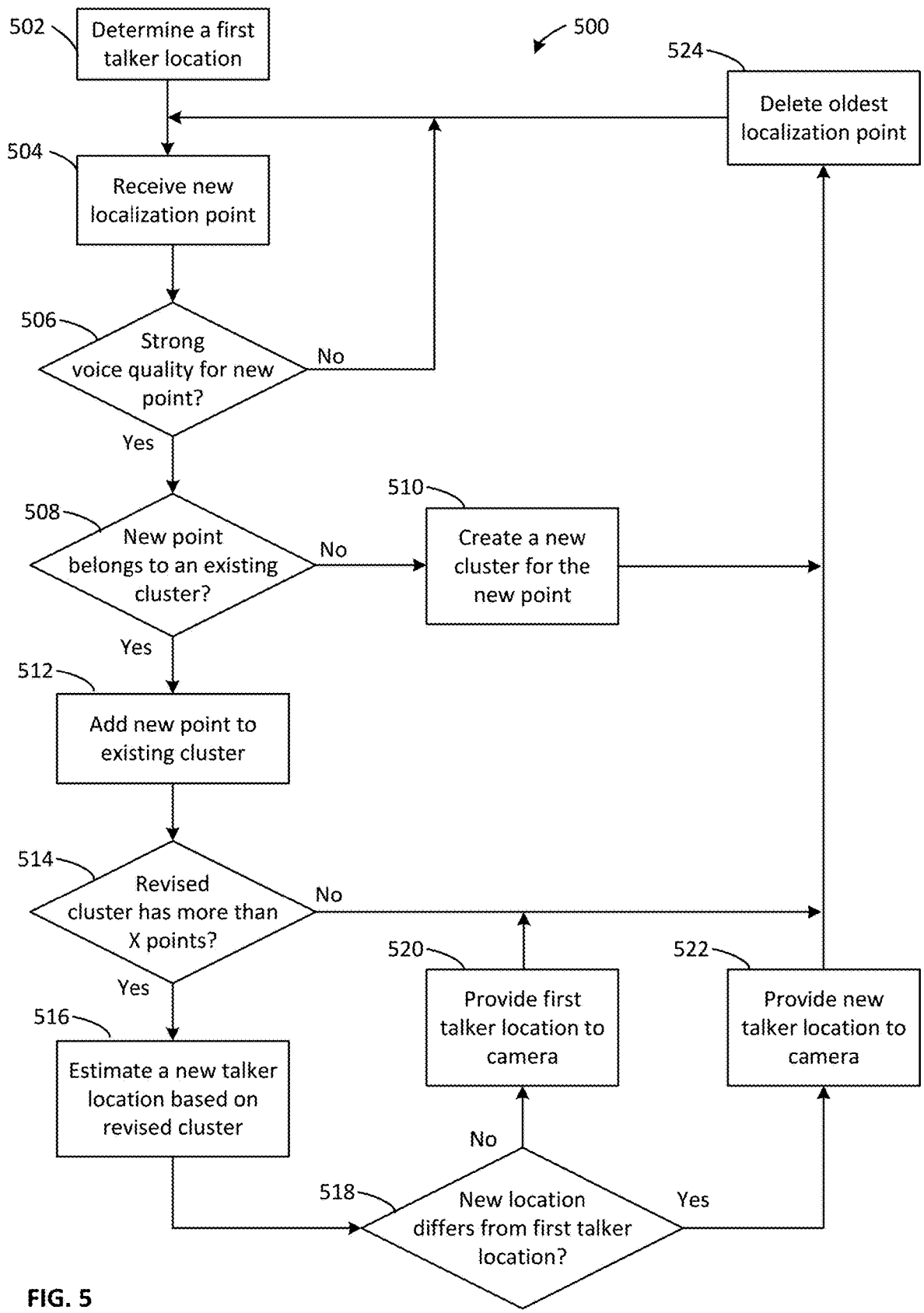
FIG. 5 is a flowchart illustrating exemplary operations for using an audio-visual system configured to steadily drive camera motion based on new audio localization data obtained by a microphone, in accordance with one or more embodiments.

Referring back to FIGS. 4 and 5, shown are exemplary operations for carrying out the dynamic audio localization clustering techniques described herein, for example, with reference to FIG. 3 and/or FIG. 6. In particular, FIG. 4 illustrates an exemplary method or process 400 for initializing an audio-visual system configured to steadily drive camera motion based on audio localization data obtained by a microphone, in accordance with embodiments. FIG. 5 illustrates an exemplary method or process 500 for using or maintaining the audio-visual system, in accordance with embodiments. The audio-visual system (e.g., system 100 of FIG. 1) may include a camera (e.g., camera 106 of FIG. 1) and microphone (e.g., microphone 104 of FIG. 1), and may be located in an environment (e.g., environment 10 of FIG. 1). The environment may be a conferencing room, event space, or other area that includes one or more talkers (e.g., talker 102 of FIG. 1) or other audio sources. The camera may be configured to detect and capture image and/or video of the talker(s). The microphone may be configured to detect and capture sounds produced by the talker(s) and determine the locations of the detected sounds. The method 400 and the method 500 may be performed by one or more processors of the audio-visual system, such as a processor of a computing device included in the system and communicatively coupled to the camera and the microphone. In some cases, the method 400 and the method 500 may be performed by a control module (e.g., control module 108 of FIG. 1) included in the system.

Starting with FIG. 4, the method 400 may include, at step 402, collecting a plurality of voice localization points for a given space or environment over a select time period. The voice localization points may be provided by the microphone and may include only the audio localization points that have been deemed to be human voice or speech activity (e.g., have a high voice quality or are otherwise confirmed voice signals) by a voice activity detector (e.g., VAD 214 in FIG. 2) included in the microphone or other component of the audio-visual system. The voice localization points may be received during the select period of time and stored in a memory included in, or coupled to, the system and/or the microphone. In various embodiments, the voice localization points may be continuously collected or received from the microphone until a threshold number, N, of points are received (e.g., 150). As will be appreciated, the collected points may include past or historical localization points as well as recently obtained or current points.

Step 404 includes identifying one or more clusters among the collection of localization points received at step 404 based on proximity using one or more of the dynamic clustering techniques described herein, including those shown in FIG. 3 and FIG. 6. In some embodiments, step 404 further includes dividing the environment into a plurality of areas or regions, for example, to facilitate sorting and clustering of the localization points. Each cluster may have one or more localization points, and each area may have zero or more clusters.

Once the localization points are grouped into corresponding clusters, the method 400 continues to step 406, which includes determining or estimating an initial talker location based on the clusters formed at step 404. The initial talker location may be a current or most recent location of the talker and may be determined based on the more recent localization points received from the microphone, using one or more of the talker location determination techniques described herein (e.g., as shown in FIG. 3 and FIG. 6). At step 408, the initial talker location is provided to the camera to cause the camera to point an image capturing component of the camera towards the initial talker location. The camera may point the image capturing component towards the initial talker location by adjusting one or more of an angle, a tilt, a zoom, and a framing of the camera, or any other relevant parameter of the camera. Thus, the method 400 may be used to initialize the audio-visual system and begin pointing or positioning a camera towards an active talker in the environment.

Referring now to FIG. 5, method 500 may begin after at least a portion of method 400 is complete (e.g., once the collection of N localization points have been sorted into clusters). As shown in FIG. 5, method 500 may begin at step 502 with determining a first talker location based on a first group (or cluster) of sound locations corresponding to audio detected by the microphone in association with one or more talkers. In embodiments, each of the new sound location and the first group of sound locations may be audio localizations determined using an audio localization algorithm executed by an audio activity localizer associated with the microphone. In some embodiments, the first talker location may be the same as the initial talker location determined by the method 400, such that step 502 overlaps with one or more steps in method 400 and/or includes the steps of method 400.

From step 502, the method 500 continues to step 504, which includes receiving a new sound location (or localization point) for new audio detected by the microphone in association with at least one talker. Step 506 includes determining a voice quality of the new audio using a voice activity detection algorithm executed by a voice activity detector ("VAD") associated with the microphone (e.g., VAD 214 in FIG. 2), comparing the voice quality of the new audio to a quality threshold, and determining whether the voice quality of the new audio exceeds the quality threshold. Based on a determination that the voice quality does not exceed the quality threshold (e.g., a "No" output at step 506), the method 500 may return to step 504 and wait for a new localization point.

Also at step 506, based on a determination that the voice quality meets or exceeds the quality threshold (e.g., a "Yes" output at step 506), the method 500 continues to step 508, which includes determining a proximity of the new sound location to the first group of sound locations. The proximity of the new sound location (or localization point) to the first group (or cluster), may be determined using the techniques shown in FIG. 3 and described herein, the techniques shown in FIG. 6 and described herein, one or more other techniques described herein, or any combination thereof. Step 508 may also include, based on the proximity, determining whether the new point belongs to an existing cluster or should be placed in a new cluster.

Based on a determination that the new sound location is not in close proximity to one or more of the sound locations in the first cluster, or the new point does not belong to an existing cluster (e.g., a "No" output at step 510), the method 500 may continue to step 510, which includes creating a new group for the new sound location. For example, the new sound location may be an indication that the talker has moved to a new location, or that a new talker or other audio source has begun speaking or otherwise generating sound.

Conversely, based on a determination that the new sound location is in close proximity to one or more of the sound locations in the first cluster, or the new point belongs to an existing cluster (e.g., a "Yes" output at step 510), the method 500 may continue to step 512, which includes modifying the first group of sound locations to include the new sound location, or adding the new localization point to an existing cluster.

In some embodiments, the method 500 may further include, before step 510, determining whether the new localization point falls within a pre-determined region or area of interest, such as, e.g., one of the audio coverage areas 308 shown in FIG. 3, or is otherwise identifiable as an outlier produced by, for example, spurious noise, reflections, or other unwanted audio source. The method 500 may further include discarding or deleting the new point (e.g., as in step 524) if the new point is an outlier. For example, in FIG. 3, new point P may be automatically discarded upon determining that the point does not fall within the boundaries of any of the existing audio coverage areas (e.g., Area 1, Area 2, Area 3, and Area 4).

Step 514 includes comparing a total number of sound locations in the first group to a threshold number, X, to determine if the modified group (or revised cluster) has more than the threshold number of sound locations (or points). Based on a determination that the total number of sound locations meets or exceeds the threshold number, or the revised cluster has more than X number of points (e.g., a "Yes" output at step 514), the method 500 may continue to step 516, which includes estimating a new talker location based on the revised cluster, for example, by determining a second talker location based on the new sound location and the first group of sound locations. In some embodiments, step 516 further includes converting the second talker location from a first coordinate system that is relative to the microphone to a second coordinate system that is relative to the camera.

At step 518, the method 500 includes determining a second proximity of the second talker location to the first talker location, or otherwise determining whether the new talker location differs from the first talker location. Based on the second proximity meeting or exceeding a threshold (e.g., a "Yes output at step 518), the method 500 continues to step 522, which includes providing the second talker location to the camera to cause the camera to point an image capturing component of the camera towards the second talker location. Conversely, based on the second proximity not exceeding the threshold (e.g., a "No" output at step 518), the method 500 continues to step 520, which includes providing the first talker location to the camera to cause the camera to point the image capturing component towards the first talker location. In either case, the camera may point an image capturing component of the camera towards the determined talker location by adjusting one or more of an angle, a tilt, a zoom, and a framing of the camera.

As shown in FIG. 5, the method 500 further includes, at step 524, deleting an oldest sound location (or point) from the first group of sound locations, or more broadly, the collection of N localization points generated in method 400, in order to keep the collection dynamic and up to date. For example, by deleting the oldest points from the collection, a moving "window" may be created for the environment that is adapted as the audio-visual event progresses. If deleting the oldest point causes a corresponding cluster to become empty, step 524 may further include deleting the empty cluster as well. In this manner, obsolete or out of date localizations, and clusters with no active talkers, can be removed from consideration when estimating the current location of an active talker, thus helping to improve an accuracy of the estimated talker location. In embodiments, step 524 may be the last step of the method 500 before looping back to step 504 and waiting for a new localization point. Accordingly, the method 500 may continue to step 524 after creating a new cluster for the new point at step 510, after determining that the revised cluster has less than X points at step 514 (e.g., a "No" output at step 514), after providing the first talker location to the camera at step 520, or after providing the new talker location to the camera at step 522.

Thus, the techniques described herein can help smooth camera motion while positioning a camera towards an active talker in an environment by using clustered localization points obtained over time to determine a current talker location and by driving camera movement using only a confirmed or smoothed talker location. The clustering techniques also avoid reporting spurious localizations that belong to reverb, noise, and other unwanted audio to the camera, which would cause the camera to point in the wrong direction. In some cases, a dynamic map of localization points and clusters may be established and maintained over time to represent the most likely locations of current talkers in the environment. Dynamic clustering of localization points can provide a more consistent or smooth estimate of talker positions in the environment. Moreover, providing coordinates of the mean, median, or other midpoint of a given cluster as the "talker location" can smooth camera movements and provide a consistent, rather than jerky, location of a talker. Only providing coordinates for clusters that contain a sufficient number of points, after ignoring or removing spurious localizations that are related to non-voice audio (e.g., footsteps) and other noises, ensures that the camera motion does not follow spurious noises and other non-talker activity. The techniques described herein may be beneficially used in various settings, including conferencing systems, gaming systems, and more, For example, since jerky camera movements prevent reliable or consistent object recognition in video images, smoothing or confirming the talker locations provided to a camera results in steady camera movements, which can provide highly stable video frames that are ideal for use with object or feature recognition algorithms.

The components of the audio-visual system 100 and/or the audio system 201 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more computers, such as a computing device having a processor and memory (e.g., a personal computer (PC), a laptop, a tablet, a mobile device, a smart device, thin client, etc.), or through a combination of both hardware and software. For example, some or all components of the microphone array 204 and/or any of the systems 100 and 201 may be implemented using discrete circuitry devices and/or using one or more processors (e.g., audio processor and/or digital signal processor) executing program code stored in a memory (not shown), the program code being configured to carry out one or more processes or operations described herein, such as, for example, the methods shown in FIGS. 4 and 5 and/or the operations depicted in FIGS. 3 and/or 6. Thus, in embodiments, the microphone array 204 and/or any of the systems 100 and 201 may include one or more processors, memory devices, computing devices, and/or other hardware components not shown in the figures.

All or portions of the processes described herein, including method 400 of FIG. 4 and method 500 of FIG. 5 may be performed by one or more processing devices or processors (e.g., analog to digital converters, encryption chips, etc.) that are within or external to the corresponding audio-visual system (e.g., system 100 of FIG. 1). In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the methods 400 and 500. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device may be physically remote (e.g., a standalone microphone) and may be communicatively coupled to the computing device.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this disclosure, the use of the disjunctive is intended to include the conjunctive. The use of definite or indefinite articles is not intended to indicate cardinality. In particular, a reference to "the" object or "a" and "an" object is intended to also denote one of a possible plurality of such objects.

This disclosure describes, illustrates and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A method using at least one processor in communication with a camera and a microphone, the method comprising:
   determining a first talker location based on a first group of sound locations corresponding to audio detected by the microphone in association with one or more talkers;
   receiving a new sound location for new audio detected by the microphone in association with at least one talker;
   determining a proximity of the new sound location to the first group of sound locations;
   based on the new sound location being in close proximity to one or more of the sound locations in the first group:
   modifying the first group of sound locations to include the new sound location;
   comparing a total number of sound locations in the first group to a threshold number; and based on the total number meeting or exceeding the threshold number, determining a second talker location based on the new sound location and the first group of sound locations;

determining a second proximity of the second talker location to the first talker location;

based on the second proximity meeting or exceeding a threshold, providing the second talker location to the camera to cause the camera to point an image capturing component of the camera towards the second talker location; and based on the second proximity not exceeding the threshold, providing the first talker location to the camera to cause the camera to point the image capturing component towards the first talker location.

2. The method of claim 1, further comprising: based on the new sound location not being in close proximity to the first group of sound locations, creating a new group for the new sound location.

3. The method of claim 1, further comprising:

determining a voice quality of the new audio using a voice activity detection algorithm executed by a voice activity detector ("VAD") associated with the microphone; and comparing the voice quality of the new audio to a quality threshold, wherein the proximity of the new sound location to the first group of sound locations is determined based on the voice quality meeting or exceeding the quality threshold.

4. The method of claim 1, further comprising: deleting an oldest sound location from the first group of sound locations.

5. The method of claim 1, further comprising: prior to receiving the new sound location, providing the first talker location to the camera to cause the camera to point the image capturing component towards the first talker location.

6. The method of claim 1, further comprising: converting the second talker location from a first coordinate system that is relative to the microphone to a second coordinate system that is relative to the camera.

7. The method of claim 1, further comprising: determining each of the new sound location and the first group of sound locations using an audio localization algorithm executed by an audio activity localizer associated with the microphone.

8. The method of claim 1, wherein the camera points the image capturing component towards the second talker location by adjusting one or more of an angle, a tilt, a zoom, and a framing of the camera.

9. A system comprising:
a microphone configured to:
detect audio in association with one or more talkers and provide a first group of sound locations corresponding to the audio; and
detect new audio in association with at least one talker and provide a new sound location corresponding to the new audio;
a camera comprising an image capturing component; and
one or more processors in communication with the microphone and the camera, the one or more processors configured to:
determine a first talker location based on the first group of sound locations;
determine a proximity of the new sound location to the first group of sound locations;

based on the new sound location being in close proximity to one or more of the sound locations in the first group:
modify the first group of sound locations to include the new sound location;
compare a total number of sound locations in the first group to a threshold number; and
based on the total number meeting or exceeding the threshold number, determine a second talker location based on the new sound location and the first group of sound locations;
determine a second proximity of the second talker location to the first talker location;
based on the second proximity meeting or exceeding a threshold, provide the second talker location to the camera; and
based on the second proximity not exceeding the threshold, provide the first talker location to the camera,
wherein the camera is configured to:
point the image capturing component towards the second talker location upon receipt of the second talker location, and
point the image capturing component towards the first talker location upon receipt of the first talker location.

10. The system of claim 9, wherein the one or more processors are further configured to: based on the new sound location not being in close proximity to the first group of sound locations, create a new group for the new sound location.

11. The system of claim 9, wherein the one or more processors are further configured to:
determine a voice quality of the new audio using a voice activity detection algorithm executed by a voice activity detector ("VAD") associated with the microphone; and
compare the voice quality of the new audio to a quality threshold,
wherein the proximity of the new sound location to the first group of sound locations is determined based on the voice quality meeting or exceeding the quality threshold.

12. The system of claim 9, wherein the one or more processors are further configured to: provide the first talker location to the camera prior to receiving the new sound location.

13. The system of claim 9, wherein the one or more processors are further configured to: convert the second talker location from a first coordinate system that is relative to the microphone to a second coordinate system that is relative to the camera.

14. The system of claim 9, further comprising: an audio activity localizer configured to execute an audio localization algorithm for determining each of the new sound location and the first group of sound locations.

15. The system of claim 9, wherein the camera is further configured to point the image capturing component towards the second talker location by adjusting one or more of an angle, a tilt, a zoom, and a framing of the camera.

16. A non-transitory computer-readable storage medium comprising instructions that, when executed by at least one processor in communication with a microphone and a camera, cause the at least one processor to perform:

determining a first talker location based on a first group of sound locations corresponding to audio detected by the microphone in association with one or more talkers;

receiving a new sound location for new audio detected by the microphone in association with at least one talker;

determining a proximity of the new sound location to the first group of sound locations;

based on the new sound location being in close proximity to one or more of the sound locations in the first group:

modifying the first group of sound locations to include the new sound location;

comparing a total number of sound locations in the first group to a threshold number; and based on the total number meeting or exceeding the threshold number, determining a second talker location based on the new sound location and the first group of sound locations;

determining a second proximity of the second talker location to the first talker location;

based on the second proximity meeting or exceeding a threshold, providing the second talker location to the camera to cause the camera to point an image capturing component of the camera towards the second talker location; and based on the second proximity not exceeding the threshold, providing the first talker location to the camera to cause the camera to point the image capturing component towards the first talker location.

17. The non-transitory computer-readable storage medium of claim 16, further comprising instructions for: determining each of the new sound location and the first group of sound locations using an audio localization algorithm executed by an audio activity localizer associated with the microphone.

18. The non-transitory computer-readable storage medium of claim 16, further comprising instructions for: based on the new sound location not being in close proximity to the first group of sound locations, creating a new group for the new sound location.

19. The non-transitory computer-readable storage medium of claim 16, further comprising instructions for:

determining a voice quality of the new audio using a voice activity detection algorithm executed by a voice activity detector ("VAD") associated with the microphone; and comparing the voice quality of the new audio to a quality threshold, wherein the proximity of the new sound location to the first group of sound locations is determined based on the voice quality meeting or exceeding the quality threshold.

20. The non-transitory computer-readable storage medium of claim 16, further comprising instructions for: prior to receiving the new sound location, providing the first talker location to the camera to cause the camera to point the image capturing component towards the first talker location.

* * * * *